US010425950B2

(12) United States Patent
Tolochko et al.

(10) Patent No.: US 10,425,950 B2
(45) Date of Patent: Sep. 24, 2019

(54) METHOD AND DEVICE FOR MITIGATING INTERFERENCE IN COLLOCATED TRANSCEIVERS

(71) Applicant: Intel IP Corporation, Santa Clara, CA (US)

(72) Inventors: Igor A. Tolochko, Stein (DE); Assi Jakoby, Herzelia (IL); Johann Steger, Munich (DE); Xiaofeng Wu, Neubiberg (DE); Bruno Jechoux, Antibes (FR); Lars Persson, Kirchseeon (DE)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/611,021

(22) Filed: Jun. 1, 2017

(65) Prior Publication Data

US 2018/0007697 A1   Jan. 4, 2018

(30) Foreign Application Priority Data

Jul. 1, 2016 (EP) ..................... 16177477

(51) Int. Cl.
*H04W 72/08* (2009.01)
*H04W 16/14* (2009.01)
*H04W 28/04* (2009.01)
*H04B 1/403* (2015.01)

(52) U.S. Cl.
CPC .......... *H04W 72/082* (2013.01); *H04B 1/406* (2013.01); *H04W 16/14* (2013.01); *H04W 28/04* (2013.01)

(58) Field of Classification Search
CPC ............ H04W 52/367; H04W 52/226; H04W 72/1215
See application file for complete search history.

(56) References Cited

U.S. PATENT DOCUMENTS

| 9,246,603 | B2 * | 1/2016 | Fu | H04B 1/1027 |
| 9,655,069 | B2 * | 5/2017 | Kelton | H04W 52/241 |
| 2009/0040937 | A1 | 2/2009 | Xhafa et al. | |
| 2011/0312288 | A1 * | 12/2011 | Fu | H04B 1/406 |
| | | | | 455/88 |
| 2012/0040715 | A1 * | 2/2012 | Fu | H04B 1/1027 |
| | | | | 455/553.1 |
| 2012/0069766 | A1 * | 3/2012 | Fu | H04B 1/406 |
| | | | | 370/252 |
| 2012/0071106 | A1 * | 3/2012 | Kadous | H04W 52/16 |
| | | | | 455/67.11 |
| 2012/0213107 | A1 * | 8/2012 | Jang | H04W 24/10 |
| | | | | 370/252 |

(Continued)

*Primary Examiner* — Dung Hong
(74) *Attorney, Agent, or Firm* — Eschweiler & Potashnik, LLC

(57) ABSTRACT

The disclosure relates to a method for mitigating interference of a first radio signal received by a first transceiver of a first radio access technology (RAT) due to transmission of a second radio signal by a second transceiver of a second RAT, wherein the first transceiver and the second transceiver are physically collocated on a same device. The method includes: pre-setting a power of the second radio signal based on a throughput performance requirement for the first radio signal before transmission of the second radio signal, and tuning the power of the second radio signal during transmission of the second radio signal based on estimating the interference of the first radio signal.

23 Claims, 7 Drawing Sheets

(56) References Cited

U.S. PATENT DOCUMENTS

| | | | |
|---|---|---|---|
| 2012/0270519 A1* | 10/2012 | Ngai | H04W 52/226 |
| | | | 455/404.1 |
| 2014/0119220 A1* | 5/2014 | Wang | H04W 52/244 |
| | | | 370/252 |
| 2015/0098392 A1* | 4/2015 | Homchaudhuri | H04W 48/20 |
| | | | 370/329 |
| 2016/0095040 A1* | 3/2016 | Valliappan | H04W 16/14 |
| | | | 370/332 |
| 2016/0211980 A1* | 7/2016 | Zhu | H04W 4/06 |
| 2017/0070926 A1* | 3/2017 | Frenger | H04W 36/0083 |
| 2018/0070320 A1* | 3/2018 | Forrester | H04W 52/30 |

* cited by examiner

METHOD AND DEVICE FOR MITIGATING INTERFERENCE IN COLLOCATED TRANSCEIVERS

REFERENCE TO RELATED APPLICATION

This application claims priority to European Patent Application No. 16177477.3, filed on Jul. 1, 2016, which is hereby incorporated herein by reference in its entirety.

FIELD

The disclosure relates to a method and a device for mitigating interference in collocated transceivers, in particular in-device coexistence (IDC) interference in a first transceiver of a first radio access technology (RAT) (such as e.g. Long Term Evolution (LTE)) from a second transceiver of a second RAT (such as e.g. Wi-Fi). The disclosure particularly relates to a low complexity interference mitigation method for IDC in LTE.

BACKGROUND

In order to allow users to access various networks and services ubiquitously, an increasing number of UEs may be equipped with multiple radio transceivers. For example, a UE 140 may be equipped with LTE, Wi-Fi, and Bluetooth transceivers, and GNSS receivers to allow communication in different networks, e.g. a cellular network 120 and a Wi-Fi network 110 as shown in FIG. 1. Due to extreme proximity of multiple radio transceivers within the same UE, the transmit power of one transmitter may be much higher than the received power level of another receiver. The receiver can experience a significant interference from the high power transmitter due to their close spectrum allocation and their physical antenna proximity on the same device. These can in turn severely degrade performance in terms of LTE Block Error Rate (BLER) resulting in throughput loss.

It may thus be desirable to provide a technique for efficiently mitigating interference in such scenarios where two transceivers are physically collocated on a same device.

BRIEF DESCRIPTION OF THE DRAWINGS

The accompanying drawings are included to provide a further understanding of aspects and are incorporated in and constitute a part of this specification. The drawings illustrate aspects and together with the description serve to explain principles of aspects. Other aspects and many of the intended advantages of aspects will be readily appreciated as they become better understood by reference to the following detailed description. Like reference numerals designate corresponding similar parts.

DETAILED DESCRIPTION

Figure 1:
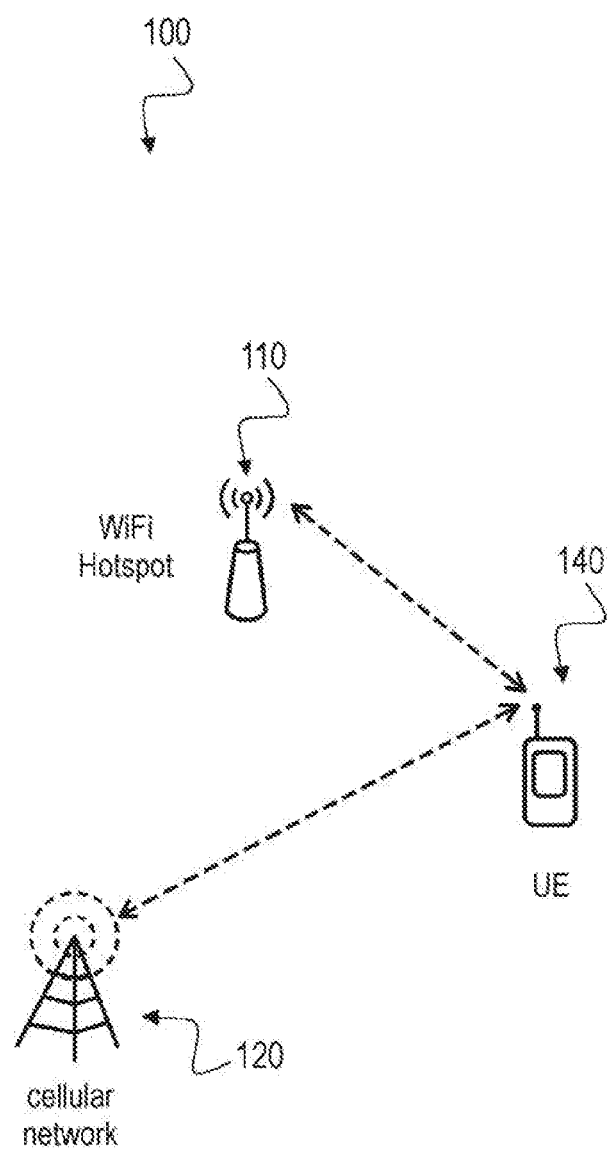
FIG. 1 is a schematic diagram illustrating a communication system 100 with a UE 140 equipped with two radio transceivers to allow communication in different networks 110, 120.

In the following detailed description, reference is made to the accompanying drawings, which form a part thereof, and in which is shown by way of illustration specific aspects in which the disclosure may be practiced. It is understood that other aspects may be utilized and structural or logical changes may be made without departing from the scope of the present disclosure. The following detailed description, therefore, is not to be taken in a limiting sense. The following terms, abbreviations and notations are used herein.

IDC: In-Device Coexistence
RAT: Radio Access Technology
BTS: Base Transceiver Station
TDD: Time Division Duplex
FDD: Frequency Division Duplex
3GPP: 3rd Generation Partnership Project
LTE: Long Term Evolution
Wi-Fi: Wireless Fidelity, IEEE 802.11
BT: Bluetooth
ISM: Industrial Scientific Medical
BLER: Block Error Rate
DL: Downlink
UL: Uplink
TX: Transmitter
RX: Receiver
TX/RX: Transceiver
RSRP: Reference Signal Received Power
MCS: Modulation and Coding Scheme
LUT: look-up table
BS: Base station, eNodeB,
RF: Radio Frequency,
UE: User Equipment,
OFDM: Orthogonal Frequency Division Multiplex,
NodeB: base station,
MIMO: Multiple Input Multiple Output.

It is understood that comments made in connection with a described method may also hold true for a corresponding device configured to perform the method and vice versa. For example, if a specific method step is described, a corresponding device may include a unit to perform the described method step, even if such a unit is not explicitly described or illustrated in the figures. Further, it is understood that the features of the various exemplary aspects described herein may be combined with each other, unless specifically noted otherwise.

The methods and devices described herein may be implemented in wireless communication networks, in particular communication networks based on mobile communication standards such as LTE, in particular LTE-A and/or OFDM. The methods and devices described below may further be implemented in a base station (NodeB, eNodeB) or a mobile device (or mobile station or User Equipment (UE)). The described devices may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

The methods and devices described herein may be configured to transmit and/or receive radio signals. Radio signals may be or may include radio frequency signals radiated by a radio transmitting device (or radio transmitter or sender) with a radio frequency lying in a range of about 3 Hz to 300 GHz. The frequency range may correspond to frequencies of alternating current electrical signals used to produce and detect radio waves.

The methods and devices described herein after may be designed in accordance with mobile communication standards such as e.g. the Long Term Evolution (LTE) standard or the advanced version LTE-A thereof. LTE (Long Term Evolution), marketed as 4G, 5G LTE and beyond, is a standard for wireless communication of high-speed data for mobile phones and data terminals. The methods and devices described herein may be applied in OFDM systems. OFDM is a scheme for encoding digital data on multiple carrier frequencies. A large number of closely spaced orthogonal sub-carrier signals may be used to carry data. Due to the orthogonality of the sub-carriers crosstalk between sub-carriers may be suppressed.

The methods and devices described herein may be applied in Wi-Fi and Bluetooth systems or any near field communication (NFC) technology. Wi-Fi is a local area wireless computer networking technology that allows electronic devices to connect to the network, mainly using the 2.4 GHz (12 cm) UHF and 5 GHz (6 cm) SHF ISM radio bands. The Wi-Fi Alliance defines Wi-Fi as any "wireless local area network" (WLAN) product based on the IEEE 802.11 standards. However, the term "Wi-Fi" is used in general English as a synonym for WLAN since most modern WLANs are based on these standards. Many devices can use Wi-Fi, e.g. personal computers, video-game consoles, smartphones, digital cameras, tablet computers and digital audio players. These can connect to a network resource such as the Internet via a wireless network access point. Such an access point (or hotspot) has a range of about 20 meters indoors and a greater range outdoors.

Bluetooth is a wireless technology standard for exchanging data over short distances (using short-wavelength UHF radio waves in the ISM band from 2.4 to 2.4835 GHz) from fixed and mobile devices, and building personal area networks (PANs). It can connect several devices, overcoming problems of synchronization.

The methods and devices described herein may be applied in LTE FDD mode systems, e.g. LTE mode systems having a type 1 LTE frame structure. The type 1 LTE frame includes 10 sub-frames each having two slots. A basic type 1 LTE frame has an overall length of 10 milliseconds (ms). The methods and devices described herein may be applied in LTE TDD mode systems, e.g. LTE mode systems having a type 2 LTE frame structure. The type 2 LTE frame has an overall length of 10 ms. The 10 ms frame comprises two half frames, each 5 ms long. The LTE half-frames are further split into five subframes, each 1 ms long.

The methods and devices described herein may be applied in Multiple-input multiple-output (MIMO) systems. MIMO wireless communication systems employ multiple antennas at the transmitter and at the receiver to increase system capacity and to achieve better quality of service. In spatial multiplexing mode, MIMO systems may reach higher peak data rates without increasing the bandwidth of the system by transmitting multiple data streams in parallel in the same frequency band.

Figure 2:
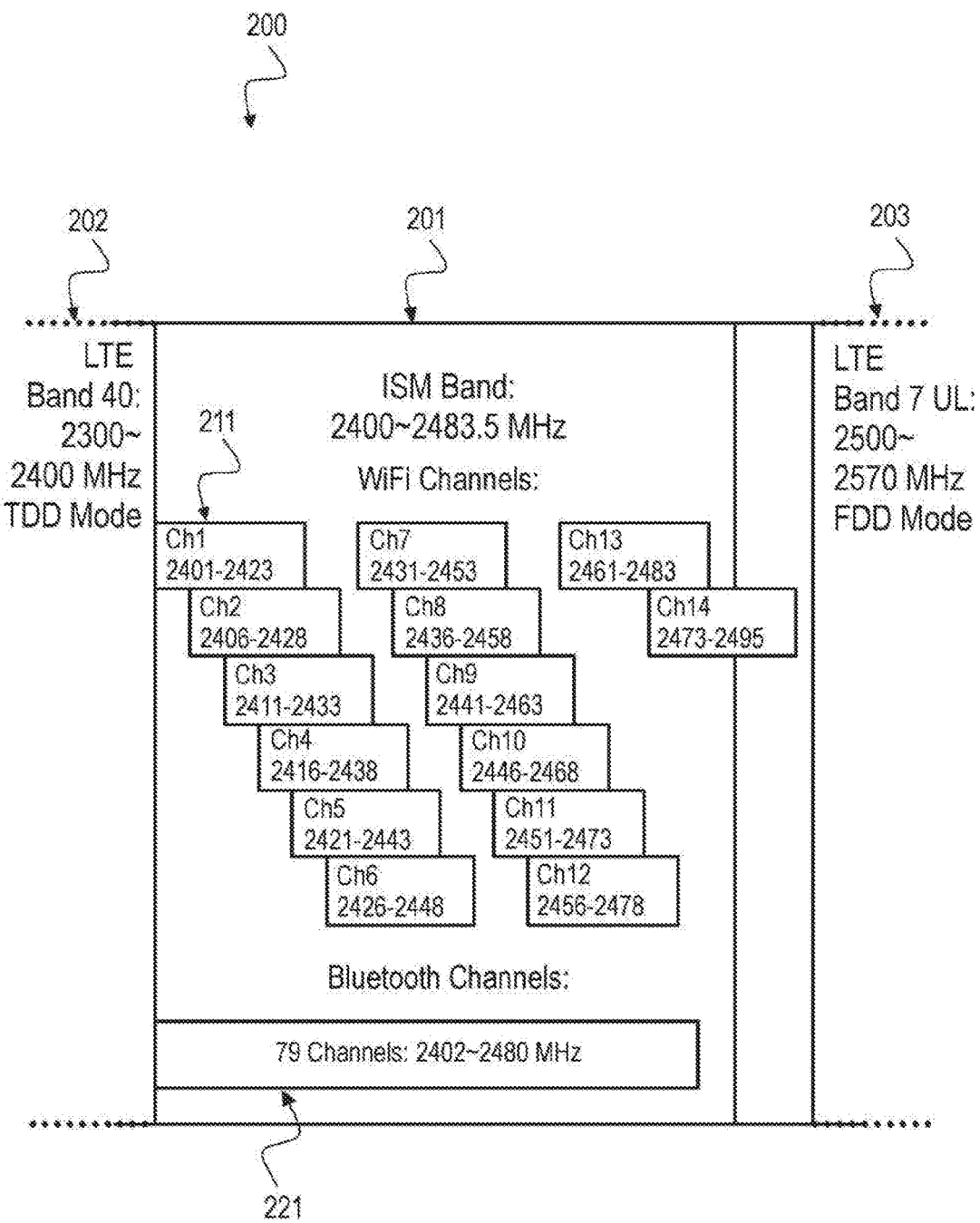
FIG. 2 is a schematic frequency diagram 200 illustrating 3GPP frequency bands 202, 203 around Industrial, Scientific and Medical (ISM) band 201 according to 3GPP TR 36.816 V11.2.0.

The methods and devices described herein may be applied in In-Device Coexistence (IDC) systems. Due to spectrum regulations for different Radio Access Technologies (RAT), such as Long Term Evolution (LTE), 802.11 (a.k.a. Wi-Fi) and Bluetooth (BT) for example, the different RAT's can simultaneously operate on adjacent radio frequencies while also being physically co-allocated on the same device. This is particularly true for LTE capable smart-phones operating in Time Division Duplex (TDD) Band 40 (2.3 to 2.4 GHz) 202 as shown in FIG. 2 that are also equipped with e.g. Wi-Fi 211 or BT 221 operating in Industrial-Scientific-Medical (ISM) band (2.40 to 2.48 GHz) 201. When e.g. Wi-Fi 211 transmits a packet, LTE 202 in simultaneous Down-Link (DL) reception can experience a significant interference from the Wi-Fi 211 due to their close spectrum allocation and their physical antenna proximity on the same device. These can in turn severely degrade performance in terms of LTE Block Error Rate (BLER) resulting in DL throughput loss. Methods and devices described herein mitigate such IDC interference.

Figure 3:
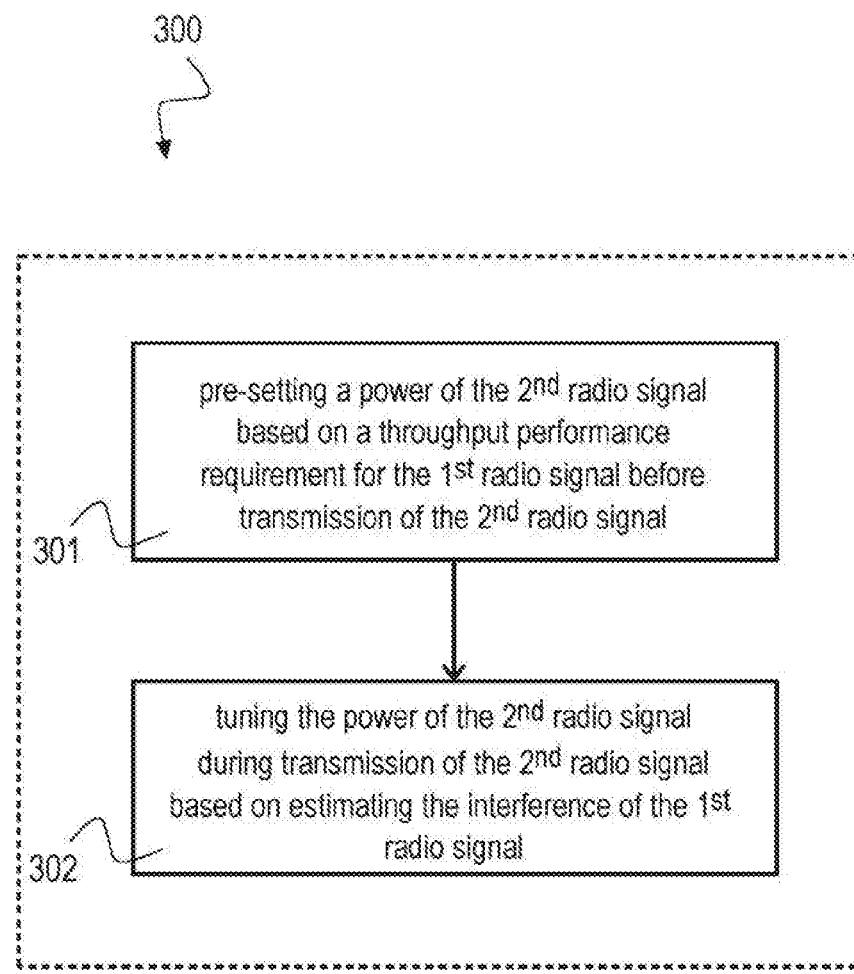
FIG. 3 is schematic diagram of a method 300 for mitigating interference in collocated transceivers.

FIG. 3 is schematic diagram of a method 300 for mitigating interference in collocated transceivers. The method 300 can be used for mitigating interference of a first radio signal received by a first transceiver of a first radio access technology (RAT) due to transmission of a second radio signal by a second transceiver of a second RAT, wherein the first transceiver and the second transceiver are physically collocated on a same device. The method 300 includes pre-setting 301 a power of the second radio signal based on a throughput performance requirement for the first radio signal before transmission of the second radio signal. The method 300 further includes tuning 302 the power of the second radio signal during transmission of the second radio signal based on estimating the interference of the first radio signal.

The first RAT may be based on a Long Term Evolution (LTE) mobile communication. The second RAT may be based on Wi-Fi, Bluetooth, ZigBee or any other radio communication technique. The first transceiver and the second transceiver may operate on adjacent frequency bands. For example, the first transceiver may operate on an LTE frequency band 40 or an LTE frequency band 41. The second transceiver may for example operate on an industrial-scientific-medical (ISM) frequency band.

The throughput performance requirement of the first radio signal may be defined based on a reference signal receive power (RSRP) of the first radio signal. A reference value for the RSRP and a threshold value relative to the reference RSRP level may be used to define the throughput performance requirement for the first radio signal, e.g. as described below with respect to FIG. 4. This threshold value may depend on a modulation and coding scheme (MCS) used by the first RAT.

The throughput performance requirement may be stored in a look-up table, e.g. in a memory, and may depend on at least one of the following configuration parameters: RSRP, block error rate (BLER) and MCS for the first radio signal. The MCS may for example include combinations of modulation schemes such as QPSK, 16QAM, 64QAM and 256QAM and rates such as 7/8, 1/2, 1/3, etc.

The method 300 may further include: monitoring the at least one of the configuration parameters RSRP, BLER and MCS by the second transceiver before pre-setting the power of the second radio signal; and determining the throughput performance requirement based on the at least one monitored configuration parameter.

The method 300 may further include: estimating the interference of the first radio signal based on determining a block error rate (BLER) of the first radio signal. Such estimation of the interference of the first radio signal may include the following: turning off the transmission of the second radio signal by the second transceiver and determining a first BLER of the first radio signal during turned-off transmission of the second radio signal; and turning on the transmission of the second radio signal by the second transceiver and determining a second BLER of the first radio signal during turned-on transmission of the second radio signal.

The method 300 may further include: determining a BLER degradation of the first radio signal based on the first BLER and the second BLER.

The method 300 may further include: tuning the power of the second radio signal based on an evaluation of the BLER degradation with respect to a threshold.

In the following, an exemplary implementation of the method 300 is described. The implementation is an interference mitigation method of LTE DL from Wi-Fi, BT, ZigBee or any other RAT Transmitter (TX) employing a two-step dynamic power control of aggressor RAT TX as a function of LTE DL standard measurements. For example, Reference Signal Received Power (RSRP) and BLER measurements can be applied as these can be continuously monitored by the aggressor RAT. The two steps are: (1) a coarse aggressor RAT TX power pre-set before to start transmission, such that LTE DL throughput performance can be maintained at least to a desired level while aggressor RAT transmission, e.g. no more than a required percentage value, for example 10% of degradation compared to the normal operational mode i.e. without interference from aggressor TX; (2) fine tuning/tracking of the aggressor RAT TX power while its transmission. These steps are subject to the performance degradation requirement and to the power control budget of LTE DL and aggressor RAT TX respectively. It is understood that further steps can be applied (at beginning, end or in between).

The interference mitigation method allows to mitigate interference from aggressor RAT TX to LTE receiver (RX) to desired levels by dynamic aggressor RAT TX power control based on standard LTE measurements such as RSRP and BLER without LTE BTS assistance and without any other changes in LTE. A low cost and a quick to the market solution can be achieved at the cost of some tolerable LTE DL performance loss.

Figure 4:
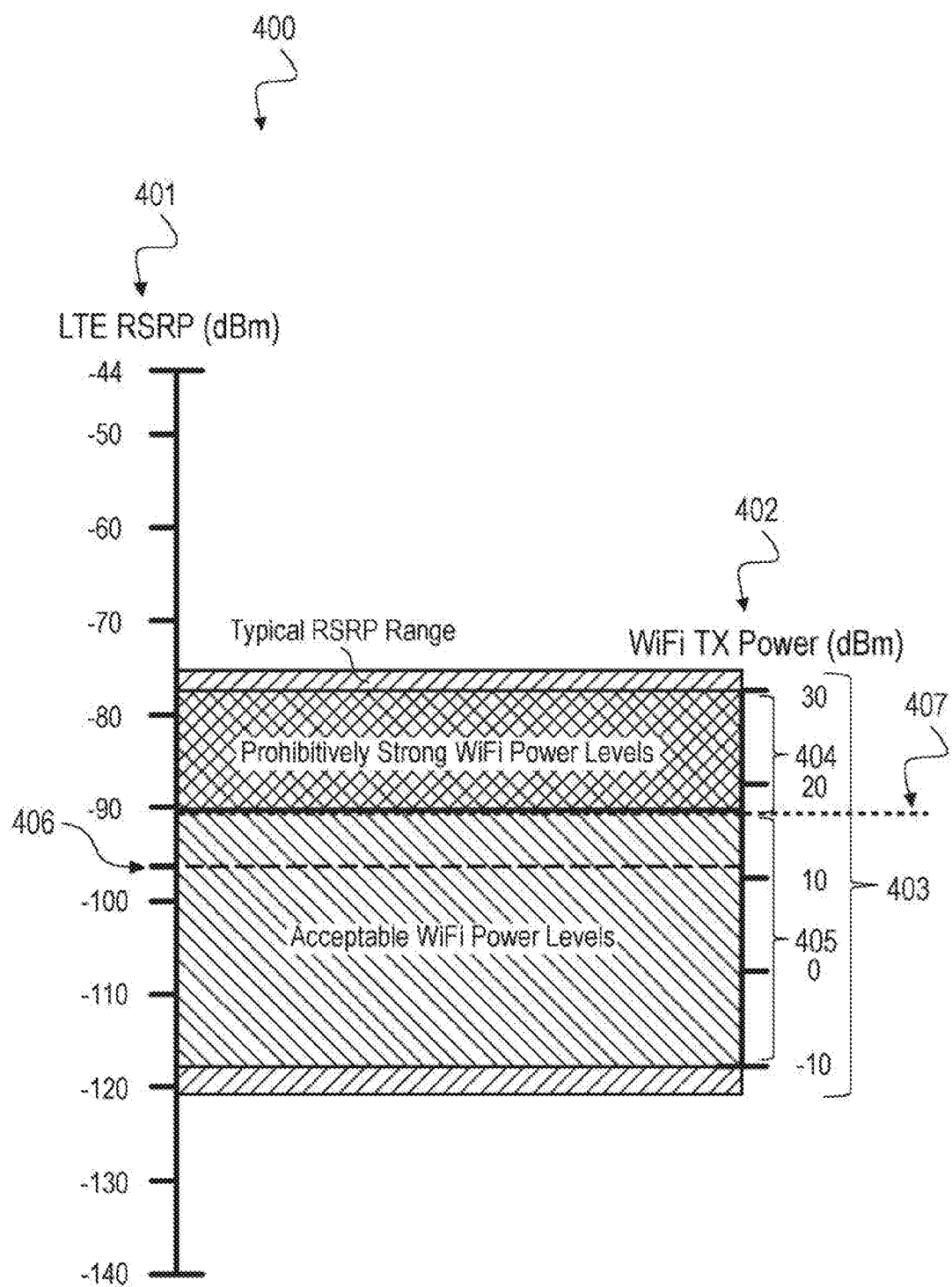
FIG. 4 is a power diagram 400 illustrating exemplary power levels for LTE downlink (DL) reference signal receive power (RSRP) and Wi-Fi TX power.

FIG. 4 is a power diagram 400 illustrating exemplary power levels for LTE downlink (DL) reference signal receive power (RSRP) and Wi-Fi TX power. The left scale 401 ranging from −140 to −44 depicts LTE RSRP in dBm while the right scale 402 ranging from −10 to +30 depicts Wi-Fi TX power in dBm. A typical RSRP range 403 is from about −120 dBm to about −75 dBm. Acceptable Wi-Fi power levels 405 can be defined ranging from about −118 dBm to about −90 dBm on the left scale 401. Prohibitively strong Wi-Fi power levels 404 can be defined ranging from about −90 dBm to about −78 dBm on the left scale 401. A threshold 407 may be defined between both ranges 404, 405. In the example depicted in FIG. 4, an exemplary RSRP level 406 is set at −96 dBm on the left scale 401.

In the following, the exemplary power chart 400 between Wi-Fi TX and LTE DL RSRP as shown in FIG. 4 is described. It is clear that the power relation between two RAT's depends on their physical antenna separation, Wi-Fi TX and LTE receiver (RX) filters, Wi-Fi channel in use and some other physical factors.

On the right-hand-side 402 of the chart 400 is shown a typical Wi-Fi TX power range, on the left-hand-side 401 the LTE DL RSRP range as defined in 3GPP TS 36.133, "Requirements for support of radio resource management", V12.7.0, March 2015. A typical RSRP range 403 is also shown in the figure. By observing the chart 400, a simple example of the interference mitigation method 300 described above with respect to FIG. 3 can be described as follows.

A Wi-Fi TX interference power, as seen by LTE in DL, can be adjusted such that the TX power never exceeds some threshold value 407 of x dB above a reference RSRP level 406, e.g. the measured RSRP by LTE DL under normal operating condition. Then, the acceptable TX power range (in terms of RSRP) can be defined as $$P_{TX\_A} \leq (x+\text{RSRP}) \text{ dBm} \quad (1)$$

and the prohibitively strong Wi-Fi TX power is defined as $$P_{TX\_N} \geq (x+\text{RSRP}) \text{ dBm}. \quad (2)$$

In the power chart example shown in FIG. 4, RSRP 406 is of −96 dBm, x is set to 6 dB and the acceptable 405 and prohibitively strong 404 power ranges are shown by the indicated boxes respectively.

As a cost function for this method can serve LTE throughput performance loss with a target loss value of e.g. $L \leq 10\%$ (or any other percentage value, e.g. 1%, 2%, 3%, 4%, 5%, 8%, 9%, 15%, 20%, 25%, 30%, etc.) as compared to the normal LTE operation, i.e. without interference. In addition to RSRP, some other standard LTE configuration parameters and measurements can be monitored by Wi-Fi such as Modulation and Coding Scheme (MCS) and BLER for example. MCS can aid as a scaling factor for parameter x and BLER can be used for interference level estimation, particularly contributed by the Wi-Fi TX as follows.

Let $\text{BLER}_{DEGRADATION}$ be a BLER degradation level defined by $$\text{BLER}_{DEGRADATION} = (1-(\text{BLER}_{TX\_Off}/\text{BLER}_{TX\_On}))*100\% \quad (3)$$

where $\text{BLER}_{Tx\_Off}$ and $\text{BLER}_{Tx\_On}$ are measured BLER, while Wi-Fi TX is switched off and on respectively.

Then insignificant and significant BLER degradation regions can be given by $$\text{BLER}_{DEGRADATION\_A} << \Delta\% \quad (4)$$

$$\text{BLER}_{DEGRADATION\_N} \geq \Delta\% \quad (5)$$

where $\Delta$ is any real number defined e.g. on the interval $\Delta \in [10, 30]\%$ (or any other interval can be used).

The power translation table of Wi-Fi TX (or any other aggressor RAT TX in general) to LTE DL RSRP can be built off-line by measurements made on the actual physical device as a function of Wi-Fi channels that potentially can cause interference to LTE DL and optionally one (e.g. the highest) MCS value. These measurements can be stored in a look-up-table (LUT) and further used by the Wi-Fi transceiver. From the LUT, the threshold x can be selected and optionally further scaled as a function of an actual MCS used by LTE in DL. The Wi-Fi TX power can then be restricted according to the acceptable range.

Figure 5:
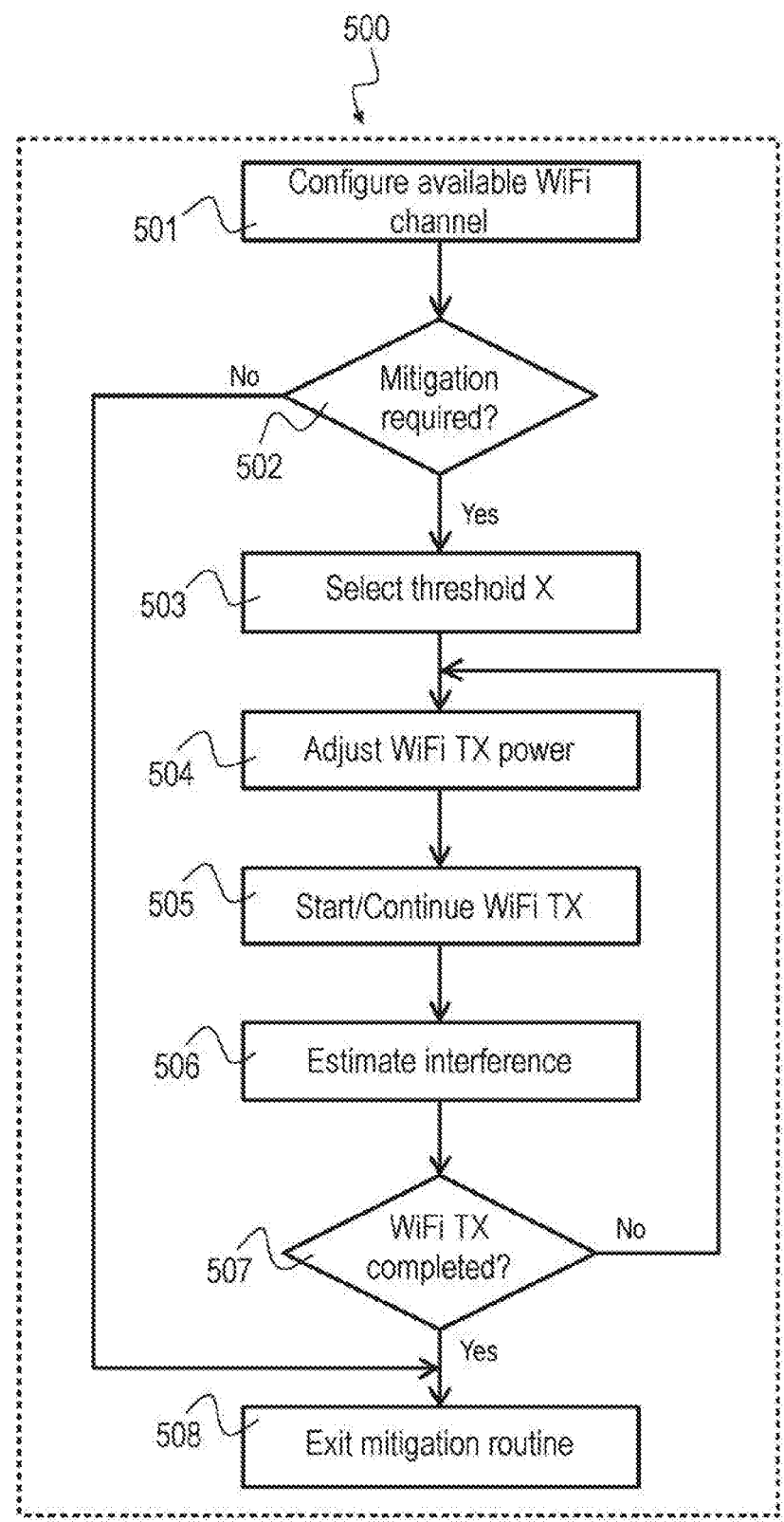
FIG. 5 is a schematic diagram illustrating a Wi-Fi power control method 500 for mitigating in-device coexistence (IDC) interference with LTE downlink.

FIG. 5 is a schematic diagram illustrating a Wi-Fi power control method 500 for mitigating in-device coexistence (IDC) interference with LTE downlink. The Wi-Fi power control method 500 is an implementation of the method 300 described above with respect to FIG. 3.

The aggressor RAT TX interference mitigation method described herein is based on the Wi-Fi example, i.e. the implementation where the second transceiver is a Wi-Fi transceiver. Before a request for Wi-Fi transmission is received, it is assumed that the Wi-Fi transceiver continuously monitors the LTE measurements and required configuration parameters, such as RSRP, BLER and MCS for example. Also, the Wi-Fi TX power adjustment budget is assumed to exist.

When a Wi-Fi transmission request is received, an available Wi-Fi channel is configured first as shown by block "CONFIGURE AVAILABLE WI-FI CHANNEL" 501. If the Wi-Fi channel has a significant frequency separation gap from the edge of an LTE band in use and/or expected interference levels in LTE DL are negligible (subject to e.g. the Wi-Fi TX power, Wi-Fi TX and LTE RX filters used), then the system is continuing its operation without engaging the interference mitigation routine. This condition is checked by block "MITIGATION REQUIRED?" 502. Otherwise, an initial (coarse) Wi-Fi TX power pre-set subroutine begins. Here, at first an appropriate threshold x is selected by block "SELECT THRESHOLD X" 503 as a function of monitored LTE RSRP and optionally MCS, making use of the pre-build LUT. Then, the Wi-Fi TX power is set by block "ADJUST WI-FI TX POWER" 504 such that the initial TX power requirement is met as defined by equation (1) (see above with respect to FIG. 4). Following the initial (coarse) TX power pre-set, the Wi-Fi TX transmission is started as shown by block "START/CONTINUE WI-FI TX" 505.

During Wi-Fi TX transmission, fine tuning/tracking of the Wi-Fi TX power is activated as described in the following. Interference level is estimated by block "ESTIMATE INTERFERENCE" 506 based on e.g. an LTE BLER report. If the interference level is relatively significant (as defined by equation (5), see above with respect to FIG. 4) or relatively insignificant (as defined by equation (4), see above with respect to FIG. 4), then the Wi-Fi power can be adjusted accordingly by block "ADJUST WI-FI TX POWER" 504 before the very next loop iteration. The loop iterates every LTE sub-frame unless a Wi-Fi TX packet is completed. This is shown by blocks "WI-FI TX COMPLETED?" 507 and "EXIT MITIGATION ROUTINE" 508 in the figure.

In one example, interference is estimated by block "ESTIMATE INTERFERENCE" 506 based on e.g. an LTE BLER report over a given number of subframes, e.g. an exemplary number of 10 subframes. If significant BLER is determined in at least one subframe, then the Wi-Fi power can be adjusted accordingly by block "ADJUST WI-FI TX POWER" 504. A significant BLER can be a BLER between 10% and 30%, for example. It is understood that any other number of subframes can be used for estimating interference and any relation of subframes having significant BLER to subframes having no significant BLER can be applied as well.

Figure 6:
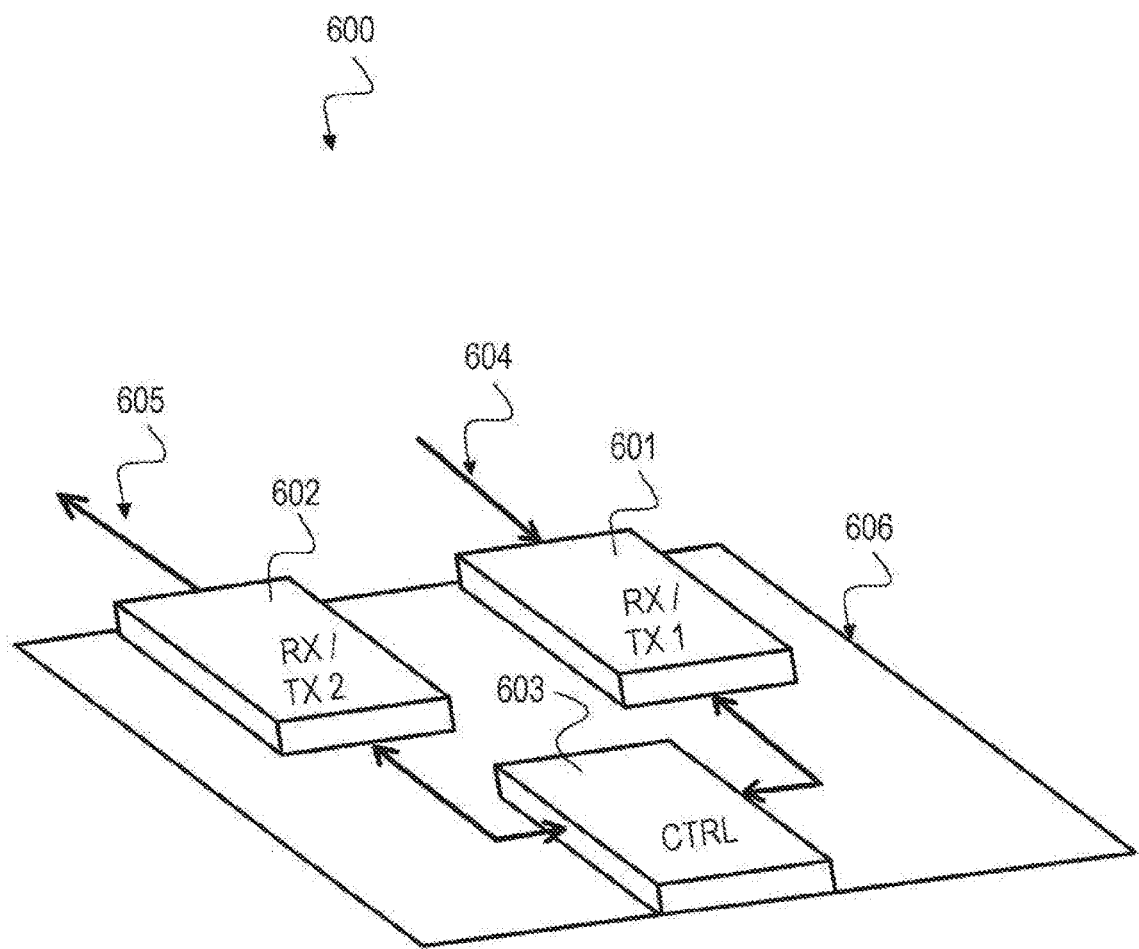
FIG. 6 is a schematic diagram of a double transceiver device 600 with two transceivers collocated on the same physical board.

FIG. 6 is a schematic diagram of a double transceiver device 600 with two transceivers collocated on the same physical board.

The double transceiver device 600 includes a first transceiver RX/TX1 601, a second transceiver RX/TX2 602 and a controller 603. Both transceivers 601, 602 are collocated on the same physical device 606, e.g. a printed circuit board (PCB). The controller 603 may be collocated with both transceivers 601, 602 on the same physical device 606. The controller 603 may have a first transceiver component for controlling the first transceiver 601 and a second transceiver component for controlling the second transceiver 602. In one example, the first transceiver component may be implemented on the first transceiver 601 or on a section of the first transceiver device 601 and the second transceiver component may be implemented on the second transceiver 602 or on a section of the second transceiver 602. Alternatively, the controller 603 may be implemented on another physical device, e.g. a second PCB.

The first transceiver 601 which may be designed according to a first radio access technology (RAT) may be configured to receive a first radio signal 604. The second transceiver 602 which may be designed according to a second RAT may be configured to transmit a second radio signal 605.

The controller 603 may be configured to mitigate interference of the first radio signal 604 due to transmission of the second radio signal 605 by performing the following blocks: 1) Pre-setting a power of the second radio signal based on a throughput performance requirement for the first radio signal before transmission of the second radio signal, and 2) tuning the power of the second radio signal during transmission of the second radio signal based on estimating the interference of the first radio signal.

These blocks performed by the controller may correspond to the methods 300 and/or 500 as described above with respect to FIGS. 3 and 5.

The transmitter 601 may be an LTE transmitter. The second transmitter 602 may be a transmitter based on Wi-Fi, Bluetooth, ZigBee or any other radio communication technique. The first transceiver 601 and the second transceiver 602 may operate on adjacent frequency bands. For example, the first transceiver 601 may operate on an LTE frequency band 40 or an LTE frequency band 41. The second transceiver 602 may for example operate on an industrial-scientific-medical (ISM) frequency band as described above with respect to FIG. 2.

Figure 7:
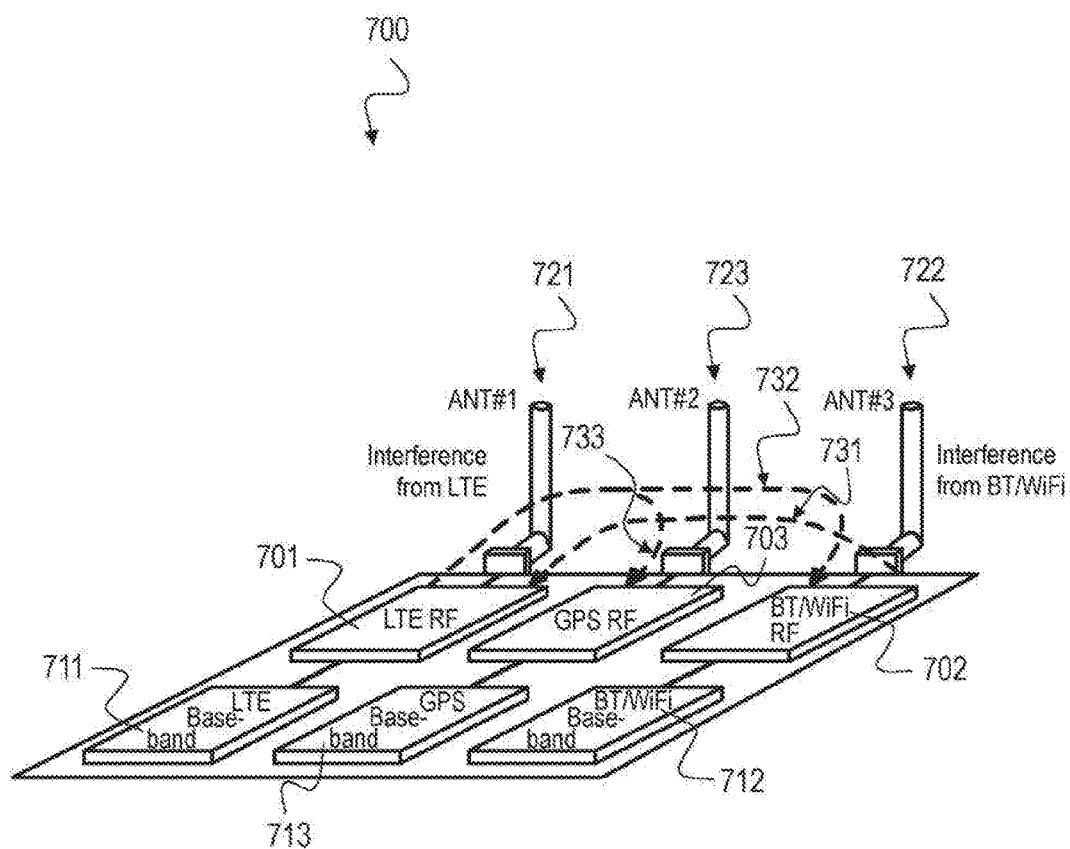
FIG. 7 is a schematic diagram of a multi transceiver device 700 according to 3GPP TR 36.816 V11.2.0 with multiple transceivers collocated on the same physical board.

FIG. 7 is a schematic diagram of a multi transceiver device 700 according to 3GPP TR 36.816 V11.2.0 with multiple transceivers collocated on the same physical board, e.g. a printed circuit board (PCB).

The multi transceiver device 700 includes a first transceiver 701 (for example an LTE RF transceiver), a second transceiver 702 (for example a BT or Wi-Fi RF transceiver) and a third transceiver 703 (for example a GPS (global positioning system) or GLONASS (Russian GLObal NAvigation Satellite System) RF receiver). Each transceiver 701, 702, 703 may be coupled to a respective baseband device 711, 712, 713. A controller according to the controller 603 described above with respect to FIG. 6 or the respective controller components for controlling the respective transceivers 701, 702, 703 may be implemented in the respective baseband devices 711, 712, 713. Each transceiver 701, 702, 703 may be coupled to a respective antenna 721, 722, 723 connected with the physical board.

In order to allow users to access various networks and services ubiquitously, the multi transceiver device 700 which may be implemented in an UE may be equipped with multiple radio transceivers 701, 702, 703. For example, a UE may be equipped with LTE 701, Wi-Fi, and Bluetooth transceivers 702, and GNSS (global navigation satellite system) receivers 703. A controller as described above with respect to FIG. 6 (not shown in FIG. 7) mitigates coexistence interference 731, 732, 733 between those collocated radio transceivers 701, 702, 703.

The methods, systems and devices described herein may be identified by simple LTE UE throughput performance tests while simultaneous e.g. Wi-Fi TX transmission in ISM band e.g. Channel 1 and LTE DL reception in band 40, under similar conditions and in the range of given Wi-Fi TX powers.

The methods, systems and devices described herein keep interference under control and mitigate interference levels, for example from Wi-Fi, BT, ZigBee or any other aggressor RAT TX to LTE DL. The methods, systems and devices described herein allow to improve LTE DL throughput performance while simultaneous aggressor RAT transmission at low cost.

The methods, systems and devices described herein may be implemented as software in a Digital Signal Processor (DSP), in a micro-controller or in any other side-processor or as hardware circuit on a chip or within an application specific integrated circuit (ASIC).

Embodiments described in this disclosure can be implemented in digital electronic circuitry, or in computer hardware, firmware, software, or in combinations thereof, e.g. in available hardware of mobile devices or in new hardware dedicated for processing the methods described herein.

The present disclosure also supports a computer program product including computer executable code or computer executable instructions that, when executed, causes at least one computer to execute the performing and computing blocks described herein, in particular the methods 300 and 500 as described above with respect to FIGS. 3 and 5. Such a computer program product may include a readable non-transitory storage medium storing program code thereon for use by a processor, the program code comprising instructions for performing any of the methods 300 and 500 as described above.

EXAMPLES

The following examples pertain to further embodiments. Example 1 is a method for mitigating interference of a first radio signal received by a first transceiver of a first radio access technology (RAT) due to transmission of a second radio signal by a second transceiver of a second RAT, wherein the first transceiver and the second transceiver are physically collocated on a same device, the method comprising: pre-setting a power of the second radio signal based on a throughput performance requirement for the first radio signal before transmission of the second radio signal; and tuning the power of the second radio signal during transmission of the second radio signal based on estimating the interference of the first radio signal.

In Example 2, the subject matter of Example 1 can optionally include that the first RAT is based on a Long Term Evolution (LTE) mobile communication; and that the second RAT is based on one of a Wi-Fi or a Bluetooth radio communication.

In Example 3, the subject matter of any one of Examples 1-2 can optionally include that the first transceiver is configured to operate on at least one of LTE frequency bands 40 or 41; and that the second transceiver is configured to operate on an industrial-scientific-medical (ISM) frequency band.

In Example 4, the subject matter of any one of Examples 1-4 can optionally include that the throughput performance requirement for the first radio signal is defined based on a reference signal receive power (RSRP) of the first radio signal.

In Example 5, the subject matter of any one of Examples 1-4 can optionally include that the throughput performance requirement for the first radio signal is defined based on a reference RSRP level for the first radio signal and a threshold value relative to the reference RSRP level.

In Example 6, the subject matter of Example 5 can optionally include that the threshold value depends on a modulation and coding scheme (MCS) used by the first RAT.

In Example 7, the subject matter of any one of Examples 1-6 can optionally include that the throughput performance requirement is stored in a look-up table and depends on at least one of the configuration parameters: RSRP, block error rate (BLER) and MCS for the first radio signal.

In Example 8, the subject matter of Example 7 can optionally include: monitoring the at least one of the configuration parameters RSRP, BLER and MCS by the second transceiver before pre-setting the power of the second radio signal; and determining the throughput performance requirement based on the at least one monitored configuration parameter.

In Example 9, the subject matter of any one of Examples 1-8 can optionally include: estimating the interference of the first radio signal based on determining a block error rate (BLER) of the first radio signal.

In Example 10, the subject matter of any one of Examples 1-9 can optionally include that estimating the interference of the first radio signal comprises: turning off the transmission of the second radio signal by the second transceiver and determining a first BLER of the first radio signal during turned-off transmission of the second radio signal; and turning on the transmission of the second radio signal by the second transceiver and determining a second BLER of the first radio signal during turned-on transmission of the second radio signal.

In Example 11, the subject matter of Example 10 can optionally include: determining a BLER degradation of the first radio signal based on the first BLER and the second BLER.

In Example 12, the subject matter of Example 11 can optionally include: tuning the power of the second radio signal based on an evaluation of the BLER degradation with respect to a threshold.

Example 13 is a double transceiver device, comprising: a first transceiver of a first radio access technology (RAT) configured to receive a first radio signal; a second transceiver of a second RAT configured to transmit a second radio signal; and a controller configured to mitigate interference of the first radio signal due to transmission of the second radio signal by: pre-setting a power of the second radio signal based on a throughput performance requirement for the first radio signal before transmission of the second radio signal; and tuning the power of the second radio signal during transmission of the second radio signal based on estimating the interference of the first radio signal.

In Example 14, the subject matter of Example 13 can optionally include that the first transceiver and the second transceiver are configured to operate on adjacent frequency bands.

Example 15 is a computer readable non-transitory medium on which computer instructions are stored which when executed by a computer cause the computer to perform the method of one of Examples 1 to 12.

In Example 16, the subject matter of Example 1 can optionally include that the first transceiver and the second transceiver are configured to operate on adjacent frequency bands.

In Example 17, the subject matter of Example 13 or 14 can optionally include that the first RAT is based on a Long Term Evolution (LTE) mobile communication; and that the second RAT is based on one of a Wi-Fi or a Bluetooth radio communication.

In Example 18, the subject matter of Example 13 or 14 can optionally include that the first transceiver is configured to operate on at least one of LTE frequency bands 40 or 41; and that the second transceiver is configured to operate on an industrial-scientific-medical (ISM) frequency band.

In Example 19, the subject matter of Example 13 or 14 can optionally include that the throughput performance requirement for the first radio signal is defined based on a reference signal receive power (RSRP) of the first radio signal.

In Example 20, the subject matter of Example 13 or 14 can optionally include that the throughput performance requirement for the first radio signal is defined based on a reference RSRP level for the first radio signal and a threshold value relative to the reference RSRP level.

In Example 21, the subject matter of Example 20 can optionally include that the threshold value depends on a modulation and coding scheme (MCS) used by the first RAT.

In Example 22, the subject matter of Example 13 or 14 can optionally include that the throughput performance requirement is stored in a look-up table and depends on at least one of the configuration parameters: RSRP, block error rate (BLER) and MCS for the first radio signal.

In Example 23, the subject matter of Example 22 can optionally include that the controller is configured to monitor the at least one of the configuration parameters RSRP, BLER and MCS by the second transceiver before pre-setting the power of the second radio signal; and that the controller is configured to determine the throughput performance requirement based on the at least one monitored configuration parameter.

In Example 24, the subject matter of Example 13 or 14 can optionally include that the controller is configured to estimate the interference of the first radio signal based on determining a block error rate (BLER) of the first radio signal.

In Example 25, the subject matter of Example 13 or 14 can optionally include that the controller is configured to estimate the interference of the first radio signal by: controlling the second transceiver to turn off the transmission of the second radio signal and determining a first BLER of the first radio signal during turned-off transmission of the second radio signal; and controlling the second transmitter to turn on the transmission of the second radio signal and determining a second BLER of the first radio signal during turned-on transmission of the second radio signal.

In Example 26, the subject matter of Example 25 can optionally include that the controller is configured to determine a BLER degradation of the first radio signal based on the first BLER and the second BLER.

In Example 27, the subject matter of Example 26 can optionally include that the controller is configured to tune the power of the second radio signal based on an evaluation of the BLER degradation with respect to a threshold.

Example 28 is a multi-transceiver device, comprising: a first radio frequency (RF) transceiver of a first radio access technology (RAT) configured to receive a first radio signal; a second RF transceiver of a second RAT configured to transmit a second radio signal; a global navigation satellite system (GNSS) receiver of a third RAT configured to receive a third radio signal; and a controller configured to mitigate interference of the first and third radio signals due to transmission of the second radio signal by: pre-setting a power of the second radio signal based on a throughput performance requirement for the first and third radio signals before transmission of the second radio signal; and tuning the power of the second radio signal during transmission of the second radio signal based on estimating the interference of the first and third radio signals.

In Example 29, the subject matter of Example 28 can optionally include that the first and second RF transceivers are collocated with the GNSS receiver on a same board.

In Example 30, the subject matter of any one of Examples 28-29 can optionally include that the first RF transceiver and the second RF transceiver are configured to operate on adjacent frequency bands.

In Example 31, the subject matter of any one of Examples 28-29 can optionally include that the multi-transceiver device further comprises: a first baseband circuit of the first RAT coupled to the first RF transceiver; a second baseband circuit of the second RAT coupled to the second RF transceiver and a third baseband circuit of the third RAT coupled to the GNSS receiver.

In Example 32, the subject matter of Example 31 can optionally include that tasks of the controller comprising the pre-setting and the tuning of the power of the second radio signal are implemented on the second baseband circuit; that a task of the controller comprising the estimating of the interference of the first radio signal is implemented on the first baseband circuit and that a task of the controller comprising the estimating of the interference of the third radio signal is implemented on the third baseband circuit.

In Example 33, the subject matter of any one of Examples 31-32 can optionally include that the first and second RF transceivers and the GNSS receiver are collocated with the first, second and third baseband circuits on a same printed circuit board.

In Example 34, the subject matter of any one of Examples 28-29 can optionally include that the multi-transceiver device further comprises: a first antenna port coupled to the first RF transceiver for receiving the first radio signal; a second antenna port coupled to the second RF transceiver for transmitting the second radio signal and a third antenna port coupled to the GNSS receiver for receiving the third radio signal.

In Example 35, the subject matter of any one of Examples 28-29 can optionally include that the first RAT is based on a Long Term Evolution (LTE) mobile communication; that the second RAT is based on one of a Wi-Fi or a Bluetooth radio communication; and that the third RAT is based on a GPS or GLONASS satellite navigation system.

In Example 36, the subject matter of any one of Examples 28-29 can optionally include that the first transceiver is configured to operate on at least one of LTE frequency bands 40 or 41; and that the second transceiver is configured to operate on an industrial-scientific-medical (ISM) frequency band.

In Example 37, the subject matter of any one of Examples 28-29 can optionally include that the throughput performance requirement for the first and third radio signals is defined based on a reference signal receive power (RSRP) of the first radio signal and an RSRP of the third radio signal.

Example 38 is a device for mitigating interference of a first radio signal received by a first transceiver of a first radio access technology (RAT) due to transmission of a second radio signal by a second transceiver of a second RAT, wherein the first transceiver and the second transceiver are physically collocated on a same device, the device comprising: means for pre-setting a power of the second radio signal based on a throughput performance requirement for the first radio signal before transmission of the second radio signal;

and means for tuning the power of the second radio signal during transmission of the second radio signal based on estimating the interference of the first radio signal.

In Example 39, the subject matter of Example 38 can optionally include that the first RAT is based on a Long Term Evolution (LTE) mobile communication; and that the second RAT is based on one of a Wi-Fi or a Bluetooth radio communication.

In Example 40, the subject matter of any one of Examples 38-39 can optionally include that the first transceiver is configured to operate on at least one of LTE frequency bands 40 or 41; and that the second transceiver is configured to operate on an industrial-scientific-medical (ISM) frequency band.

Example 41 is an in-device coexistence interference mitigation system, comprising: a first transceiver of a first radio access technology (RAT) configured to receive a first radio signal; a second transceiver of a second RAT configured to transmit a second radio signal; and a mitigation subsystem configured to mitigate interference of the first radio signal due to transmission of the second radio signal, wherein the mitigation subsystem is configured to pre-set a power of the second radio signal based on a throughput performance requirement for the first radio signal before transmission of the second radio signal; and to tune the power of the second radio signal during transmission of the second radio signal based on estimating the interference of the first radio signal.

In Example 42, the subject matter of Example 41 can optionally include that the first transceiver and the second transceiver are configured to operate on adjacent frequency bands.

In Example 43, the subject matter of any one of Examples 41-42 can optionally include that the first RAT is based on a Long Term Evolution (LTE) mobile communication; and that the second RAT is based on one of a Wi-Fi or a Bluetooth radio communication.

In Example 44, the subject matter of any one of Examples 41-42 can optionally include that the first transceiver is configured to operate on at least one of LTE frequency bands 40 or 41; and that the second transceiver is configured to operate on an industrial-scientific-medical (ISM) frequency band.

Example 45 is a method of interference mitigation in LTE DL from Wi-Fi, BT, ZigBee or any other aggressor RAT TX, while both LTE and an aggressor RAT are physically co-located on the same device and both operate on adjacent frequency bands, the method comprising the following steps: Initial (coarse) aggressor RAT TX power pre-set based on standard LTE measurements; and Dynamic (fine) tuning/ tracking of aggressor RAT TX power while aggressor TX transmission based on continuous monitoring of LTE measurements.

In Example 46, the subject matter of Example 45 can optionally include that interference mitigation criterion is based on the delta frequency difference between aggressor RAT TX and LTE DL frequency.

In Example 47, the subject matter of Example 45 can optionally include that interference mitigation criterion is based on the aggressor RAT TX power.

In Example 48, the subject matter of Example 45 can optionally include that interference mitigation effort is based on the standard LTE measurements.

In Example 49, the subject matter of Example 45 can optionally include that interference mitigation is conducted by aggressor RAT transceiver based on standard LTE measurements.

In addition, while a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Furthermore, it is understood that aspects of the disclosure may be implemented in discrete circuits, partially integrated circuits or fully integrated circuits or programming means. Also, the terms "exemplary", "for example" and "e.g." are merely meant as an example, rather than the best or optimal.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

The invention claimed is:

1. A method for mitigating interference of a first radio signal received by a first transceiver of a first radio access technology (RAT) due to transmission of a second radio signal by a second transceiver of a second RAT, wherein the first transceiver and the second transceiver are physically collocated on a same device, the method comprising:
    pre-setting a power of the second radio signal based on a throughput performance requirement for the first radio signal before a continuous transmission of the second radio signal, wherein the throughput performance requirement depends on at least one of the configuration parameters: RSRP, block error rate (BLER) and MCS for the first radio signal;
    tuning the power of the second radio signal during transmission of the second radio signal based on estimating the interference of the first radio signal;
    monitoring the at least one of the configuration parameters RSRP, BLER and MCS by the second transceiver before pre-setting the power of the second radio signal; and
    determining the throughput performance requirement based on the at least one monitored configuration parameter.

2. The method of claim 1,
    wherein the first RAT is based on a Long Term Evolution (LTE) mobile communication; and
    wherein the second RAT is based on one of a WiFi or a Bluetooth radio communication.

3. The method of claim 1,
    wherein the first transceiver is configured to operate on at least one of LTE frequency bands 40 or 41; and
    wherein the second transceiver is configured to operate on an industrial-scientific-medical (ISM) frequency band.

4. The method of claim 1,
    wherein the throughput performance requirement for the first radio signal is defined based on a reference signal receive power (RSRP) of the first radio signal.

5. The method of claim 1,
    wherein the throughput performance requirement for the first radio signal is defined based on a reference RSRP level for the first radio signal and a threshold value relative to the reference RSRP level.

6. The method of claim 5,
wherein the threshold value depends on a modulation and coding scheme (MCS) used by the first RAT.

7. The method of claim 1, comprising:
estimating the interference of the first radio signal based on determining a block error rate (BLER) of the first radio signal.

8. A method for mitigating interference of a first radio signal received by a first transceiver of a first radio access technology (RAT) due to transmission of a second radio signal by a second transceiver of a second RAT, wherein the first transceiver and the second transceiver are physically collocated on a same device, the method comprising:
pre-setting a power of the second radio signal based on a throughput performance requirement for the first radio signal before a continuous transmission of the second radio signal, and
tuning the power of the second radio signal during transmission of the second radio signal based on estimating the interference of the first radio signal;
wherein estimating the interference of the first radio signal comprises:
turning off the transmission of the second radio signal by the second transceiver and determining a first BLER of the first radio signal during turned-off transmission of the second radio signal; and
turning on the transmission of the second radio signal by the second transceiver and determining a second BLER of the first radio signal during turned-on transmission of the second radio signal.

9. The method of claim 8, comprising:
determining a BLER degradation of the first radio signal based on the first BLER and the second BLER.

10. The method of claim 9, comprising:
tuning the power of the second radio signal based on an evaluation of the BLER degradation with respect to a threshold.

11. A double transceiver device, comprising:
a first transceiver of a first radio access technology (RAT) configured to receive a first radio signal;
a second transceiver of a second RAT configured to transmit a second radio signal; and
a controller configured to mitigate interference of the first radio signal due to transmission of the second radio signal by:
pre-setting a power of the second radio signal based on a throughput performance requirement for the first radio signal and not on a throughput performance requirement of the second radio signal, before a continuous transmission of the second radio signal; and
tuning the power of the second radio signal during transmission of the second radio signal based on estimating the interference of the first radio signal.

12. The device of claim 11,
wherein the first transceiver and the second transceiver are configured to operate on adjacent frequency bands.

13. The device of claim 11,
wherein the first RAT is based on a Long Term Evolution (LTE) mobile communication; and that the second RAT is based on one of a WiFi or a Bluetooth radio communication.

14. The device of claim 11,
wherein the first transceiver is configured to operate on at least one of LTE frequency bands 40 or 41; and
wherein the second transceiver is configured to operate on an industrial-scientific-medical (ISM) frequency band.

15. The device of claim 11,
wherein the throughput performance requirement for the first radio signal is defined based on a reference signal receive power (RSRP) of the first radio signal.

16. A multi-transceiver device, comprising:
a first radio frequency (RF) transceiver of a first radio access technology (RAT) configured to receive a first radio signal;
a second RF transceiver of a second RAT configured to transmit a second radio signal;
a global navigation satellite system (GNSS) receiver of a third RAT configured to receive a third radio signal; and
a controller configured to mitigate interference of the first and third radio signals due to transmission of the second radio signal by:
pre-setting a power of the second radio signal based on a throughput performance requirement for the first and third radio signals, and not on a throughput performance requirement of the second radio signal, before a continuous transmission of the second radio signal; and
tuning the power of the second radio signal during transmission of the second radio signal based on estimating the interference of the first and third radio signals.

17. The device of claim 16,
wherein the first and second RF transceivers are collocated with the GNSS receiver on a same board.

18. The device of claim 16,
wherein the first RF transceiver and the second RF transceiver are configured to operate on adjacent frequency bands.

19. The device of claim 16, wherein the multi-transceiver device further comprises:
a first baseband circuit of the first RAT coupled to the first RF transceiver;
a second baseband circuit of the second RAT coupled to the second RF transceiver; and
a third baseband circuit of the third RAT coupled to the GNSS receiver.

20. The device of claim 19,
wherein tasks of the controller comprising the pre-setting and the tuning of the power of the second radio signal are implemented on the second baseband circuit;
wherein a task of the controller comprising the estimating of the interference of the first radio signal is implemented on the first baseband circuit; and
wherein a task of the controller comprising the estimating of the interference of the third radio signal is implemented on the third baseband circuit.

21. The device of claim 19,
wherein the first and second RF transceivers and the GNSS receiver are collocated with the first, second and third baseband circuits on a same printed circuit board.

22. The device of claim 16, wherein the multi-transceiver device further comprises:
a first antenna port coupled to the first RF transceiver for receiving the first radio signal;
a second antenna port coupled to the second RF transceiver for transmitting the second radio signal; and
a third antenna port coupled to the GNSS receiver for receiving the third radio signal.

23. The device of claim 16,
wherein the first RAT is based on a Long Term Evolution (LTE) mobile communication;
wherein the second RAT is based on one of a WiFi or a Bluetooth radio communication; and wherein the third RAT is based on a GPS or GLONASS satellite navigation system.

* * * * *